(12) United States Patent
Shin et al.

(10) Patent No.: US 12,275,137 B2
(45) Date of Patent: Apr. 15, 2025

(54) MULTI-LAYERED SOFT PNEUMATIC ACTUATOR AND ROBOT MECHANISM INCLUDING THE SAME

(71) Applicant: POSTECH Research and Business Development Foundation, Pohang-si (KR)

(72) Inventors: Hyung Gon Shin, Seoul (KR); Keehoon Kim, Seoul (KR); Wan Kyun Chung, Pohang-si (KR)

(73) Assignee: POSTECH RESEARCH AND BUSINESS DEVELOPMENT FOUNDATION, Pohang-si (KR)

(*) Notice: Subject to any disclaimer, the term of this patent is extended or adjusted under 35 U.S.C. 154(b) by 141 days.

(21) Appl. No.: 18/070,657

(22) Filed: Nov. 29, 2022

(65) Prior Publication Data

US 2023/0166408 A1    Jun. 1, 2023

(30) Foreign Application Priority Data

Nov. 30, 2021    (KR) ........................ 10-2021-0169037

(51) Int. Cl.
*B25J 15/06* (2006.01)
*B25J 15/00* (2006.01)
*F15B 15/10* (2006.01)

(52) U.S. Cl.
CPC ....... *B25J 15/0023* (2013.01); *B25J 15/0033* (2013.01); *F15B 15/10* (2013.01); *F15B 2215/30* (2013.01)

(58) Field of Classification Search
CPC ...... B25J 9/142; B25J 9/1075; B25J 15/0023; B25J 15/0033; F15B 15/103
See application file for complete search history.

(56) References Cited

U.S. PATENT DOCUMENTS

| 3,327,832 A | 6/1967 | Kyle |
| 3,985,064 A | 10/1976 | Johnson |
| 2015/0143990 A1* | 5/2015 | Van Buskirk ........... F01B 19/04 92/37 |

FOREIGN PATENT DOCUMENTS

| KR | 10-2007-0102769 | 10/2007 |
| KR | 10-1060723 | 8/2011 |

OTHER PUBLICATIONS

Zhicong Deng et al., "A Novel Soft Machine Table for Manipulation of Delicate Objects Inspired by Caterpillar Locomotion", IEEE/ASME Transactions on Mechatronics, vol. 21, No. 3, Jun. 2016.

(Continued)

*Primary Examiner* — Randell J Krug
(74) *Attorney, Agent, or Firm* — LEX IP MEISTER, PLLC

(57) ABSTRACT

Disclosed is a multi-layer soft pneumatic actuator, including: a surface layer including driving protrusions formed on one surface; a first chamber layer stacked on the other surface of the surface layer and including a first chamber configured to partially overlap the driving protrusion; a second chamber layer stacked on a layer different from the first chamber layer on the other surface of the surface layer, including a second chamber having a partial region overlapping the driving protrusion and the first chamber; and an air line layer configured to inject air into each of the first chamber and the second chamber.

21 Claims, 19 Drawing Sheets

(56) References Cited

OTHER PUBLICATIONS

Nikhil Chavan Dafle et al., "Extrinsic Dexterity: In-Hand Manipulation with External Forces", 2014 IEEE International Conference on Robotics & Automation (ICRA), Hong Kong Convention and Exhibition Center May 31-Jun. 7, 2014. Hong Kong, China.
Marcin Andrychowicz et al., "Learning dexterous in-hand manipulation", The International Journal of Robotics Research, 2020, vol. 39(1) 3-20.

* cited by examiner

MULTI-LAYERED SOFT PNEUMATIC ACTUATOR AND ROBOT MECHANISM INCLUDING THE SAME

CROSS-REFERENCE TO RELATED APPLICATION

This application claims priority to and the benefit of Korean Patent Application No. 10-2021-0169037 filed in the Korean Intellectual Property Office on Nov. 30, 2021, the entire contents of which are incorporated herein by reference.

BACKGROUND

1. Field

The present disclosure relates to a soft pneumatic actuator and a robot mechanism including the same.

2. Description of the Related Art

Many robotic tasks require the ability to rotate or move objects in the air. This is also called "in-hand manipulation", which means changing a position of an object in the hand.

An example of in-hand manipulation is a peg-in hole that is a task occurring frequently in the assembling of components by using industrial robots. The robot picks up a peg, aligns the peg with a hole, and inserts an object into the hole. When the robot aligns the peg with the hole, the object needs to be rotated or moved while the robot gripper is holding the object. However, this is difficult because when additional force is applied to the surface of the object to rotate or move the object, the force may change the system dynamics, making it impossible to grip the object.

In order to change a position or angle of an object with the existing multi-degree-of-freedom industrial robot arm, it is necessary to place the object on the ground and hold the object again, or move the rest of the arm. This is because the robot gripper cannot perform complex motions like a human hand, but can only simply pick and place down the object. As an example of previously known in-hand manipulation technology, there is a technique to move an object by using contact with an external object and frictional force, but the technology is dependent on the external environment, and there is a limit in that accurate physical modeling considering the friction constant for each object is required.

In addition, the existing technique for manufacturing a table with several pneumatic chambers in an array format and manipulating the table on the surface is known, but due to the complexity of the structure and manufacturing process, it is difficult to reduce the size, and there is a limitation that only objects placed on a wide plane can be manipulated.

The existing technique of manipulating a quadrangular cube with a high degree of freedom and a complex robot hand is also known, but it requires complex robotic hands with high degrees of freedom, and deep learning networks need to be retrained to manipulate other objects, and the manipulation is possible only when the object is on the palm of the hand, so that there is a limitation in that it is impossible to manipulate an object in a position where the object is lifted from the floor.

In robot task, the problem of moving an object while holding the object in the air occurs not only in the peg-in hole but also in the case of manipulating living tissue in a surgical operation by using a robot. Various studies have been made to respond to these demands, but as described above, there is a limitation in that the structure is complicated or the structure is difficult to be used universally, so that there is a need for a device to solve this problem.

The above information disclosed in this Background section is only for enhancement of understanding of the background of the described technology, and therefore it may contain information that does not form the prior art that is already known in this country to a person of ordinary skill in the art.

SUMMARY

The described technology has been made in an effort to provide a multi-layer soft pneumatic actuator capable of providing surface driving force to rotate or move an object while a robot mechanism is holding the object, or applying tangential force while an object is in contact with the mechanism.

The present disclosure has also been made in an effort to provide a robot mechanism including a multi-layer soft pneumatic actuator capable of providing surface driving force to rotate or move an object in a state of holding an object or being in contact with the object.

However, the object to be solved in the embodiments is not limited to the foregoing object, and may be variously extended in the scope of the technical spirit included in the present disclosure.

An embodiment provides a multi-layer soft pneumatic actuator, including: a surface layer including driving protrusions formed on one surface; a first chamber layer stacked on the other surface of the surface layer and including a first chamber configured to partially overlap the driving protrusion; a second chamber layer stacked on a layer different from the first chamber layer on the other surface of the surface layer, including a second chamber having a partial region overlapping the driving protrusion and the first chamber; and an air line layer configured to inject air into each of the first chamber and the second chamber.

The multi-layer soft pneumatic actuator may further include a bottom layer provided under the air line layer.

The bottom layer may include a material having greater rigidity than rigidity of the surface layer.

The first chamber layer may be provided under the surface layer, and the second chamber layer may be provided under the first chamber layer.

The first chamber may include a region in which the first chamber layer is surface-treated or surface-etched by a predetermined area in a surface facing the surface layer, so that the first chamber layer is not bonded to the surface layer.

The second chamber may include a region in which the second chamber layer is surface-treated or surface-etched by a predetermined area in a surface facing the first chamber layer, so that the second chamber layer is not bonded to the first chamber layer.

The driving protrusion may have a round cross-section convexly in an upper direction.

The air line layer may include at least one of a first air line connected to the first chamber and a second air line connected to the second chamber.

The first air line may include a first via extending in a thickness direction and communicating with the first chamber, and a first injection line communicating with the first via and extending in a plane direction, and the second air line may include a second via extending in a thickness direction and communicating with the second chamber, and a second injection line communicating with the second via and extending in a plane direction.

The first via may be connected to a region in which the first chamber does not overlap the second chamber, and the second via may be connected to a region in which the second chamber does not overlap the first chamber.

The first chamber layer and the second chamber layer may include an overlapping region in which the first chamber layer and the second chamber layer overlap in a thickness direction on a plane, and the driving protrusion may be configured to be located in the overlapping region on the plane.

A planar area of the driving protrusion may be smaller than or equal to a planar area of the overlapping region.

The driving protrusion may be located to be biased to one side from the center of each of the first chamber layer and the second chamber layer.

The driving protrusion may have a semi-cylindrical shape in which a central axis is located on the surface layer.

The multi-layer soft pneumatic actuator may further include: a third chamber layer provided in a layer different from the surface layer, the first chamber layer, and the second chamber layer, and including a third chamber having a partial region overlapping the driving protrusion, the first chamber, and the second chamber; and a fourth chamber layer provided in a layer different from the surface layer, the first chamber layer, the second chamber layer, and the third chamber layer, and including a fourth chamber having a partial region overlapping the driving protrusion, the first chamber, the second chamber, and the third chamber.

The driving protrusion may have a hemispherical shape or a cylindrical shape with a central axis vertical to the surface layer.

Another embodiment provides a multi-layer soft pneumatic actuator including a plurality of driving units, in which the driving unit may include: a surface layer with driving protrusions formed on one surface; a first chamber layer stacked on the other surface of the surface layer and including a first chamber configured to partially overlap the driving protrusion; and a second chamber layer stacked on a layer different from the first chamber layer on the other surface of the surface layer, including a second chamber having a partial region overlapping the driving protrusion and the first chamber.

The plurality of driving units may be arranged in four directions.

At least one pair of driving units adjacent to each other among the plurality of driving units may be configured to provide driving force in directions crossing each other.

The pneumatic actuator may further include a support protrusion disposed between one pair of driving units adjacent in a diagonal direction among the plurality of driving units.

The plurality of driving units may be formed in an array-arranged strip shape.

The strip may include a plurality of main lines which extend in a longitudinal direction and through which air is supplied, and a first air line connected to the first chamber and a second air line connected to the second chamber may be branched from different main lines and connected.

Still another embodiment provides a robot mechanism including the multi-layer soft pneumatic actuator.

The robot mechanism may be a robot hand including a gripper, and the gripper may include the multi-layer soft pneumatic actuator on a surface.

According to the multi-layer soft pneumatic actuator according to the embodiments, it is possible to provide surface driving force to rotate or move an object while the hand of the robot is holding the object.

In addition, when an object is in contact with the actuator, tangential force may be provided to the object.

Furthermore, according to the multi-layer soft pneumatic actuator according to the embodiment, there is an advantage in that it is possible to manufacture the actuator through a simple manufacturing method of overlapping several simple soft layers, and through this, the structure of the actuator may be made small in micro size in the future.

DETAILED DESCRIPTION OF THE EXEMPLARY EMBODIMENTS

Figure 1:
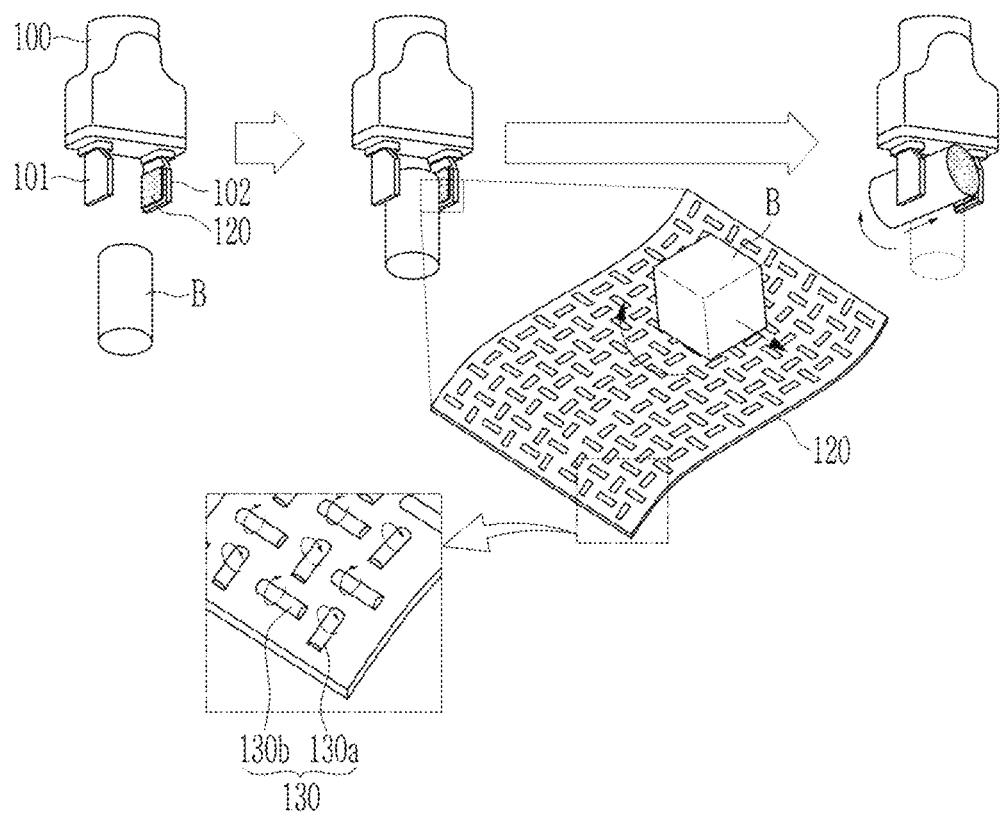
FIG. 1 is a perspective view illustrating a multi-layer soft pneumatic actuator and a robot hand having the same according to an embodiment.

Hereinafter, embodiments will be described in detail with reference to the accompanying drawings so that those skilled in the art may easily implement the present disclosure. The drawings and description are to be regarded as illustrative in nature and not restrictive. Like reference numerals designate like elements throughout the specification. Further, some constituent elements in the drawing may be exaggerated, omitted, or schematically illustrated, and a size of each constituent element does not reflect the actual size entirely.

Further, the accompanying drawings are provided for helping to easily understand embodiments disclosed in the present specification, and the technical spirit disclosed in the present specification is not limited by the accompanying drawings, and it will be appreciated that the present disclosure includes all of the modifications, equivalent matters, and substitutes included in the spirit and the technical scope of the present disclosure.

Terms including an ordinary number, such as first and second, are used for describing various constituent elements, but the constituent elements are not limited by the terms. The terms are used only to discriminate one constituent element from another constituent element.

It will be understood that when an element such as a layer, film, region, or substrate is referred to as being "above" or "on" another element, it can be directly on the other element or intervening elements may also be present. In contrast, when an element is referred to as being "directly on" another element, there are no intervening elements present. Further, when an element is "above or "on" a reference portion, the element is located above or below the reference portion, and it does not necessarily mean that the element is located "above" or "on" in a direction opposite to gravity.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance. Accordingly, unless explicitly described to the contrary, the word "comprise" and variations such as "comprises" or "comprising", will be understood to imply the inclusion of stated elements but not the exclusion of any other elements.

Further, in the entire specification, when it is referred to as "in a plane", it means when a target part is viewed from above, and when it is referred to as "in a cross-section", it means when the cross-section obtained by cutting a target part vertically is viewed from the side.

Further, throughout the specification, when it is referred to as "connected", this does not only mean that two or more constituent elements are directly connected, but may mean that two or more constituent elements are indirectly connected through another constituent element, are physically connected, electrically connected, or are integrated even though two or more constituent elements are referred to as different names depending on a location and a function.

FIG. 1 is a perspective view illustrating a multi-layer soft pneumatic actuator and a robot hand having the same according to an embodiment.

Referring to FIG. 1, a robot hand 100 according to a present embodiment may include at least a pair of grippers 101 and 102 capable of holding an object B. The multi-layer soft pneumatic actuator 120 according to the present embodiment may be attached to an inner surface of each of the grippers 101 and 102. The inner surfaces of the grippers 101 and 102 may include surfaces that come into contact with the object B when the robot hand 100 holds the object B. That is, the multi-layer soft pneumatic actuator 120 may be disposed in a portion of the robot hand 100 that is in contact with the object B.

The multi-layer soft pneumatic actuator 120 has a thin sheet shape including a plurality of driving protrusions 130 on a surface thereof and may be made of a flexible material. Each of the driving protrusions 130 may have a substantially rectangular planar shape and may be formed to protrude in the upper direction and be round convexly. The driving protrusions 130 may include first driving protrusions 130a and second driving protrusions 130b that are alternately arranged in directions crossing each other. The first driving protrusion 130a and the second driving protrusion 130b may be arrayed in all directions in the transverse and longitudinal directions on the surface of the multi-layer soft pneumatic actuator 120. In this case, the first driving protrusion 130a and the second driving protrusion 130b adjacent to each other may provide driving force in the directions crossing each other.

Hereinafter, a structure of a unit driving unit of the multi-layer soft pneumatic actuator 120 will be described in detail with reference to the drawings.

Figure 2:
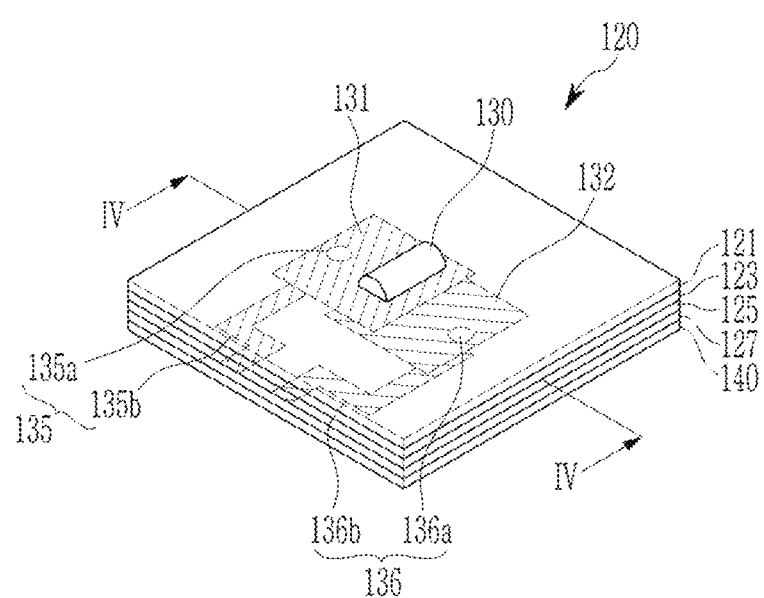
FIG. 2 is a perspective view illustrating a unit driving unit of the multi-layer soft pneumatic actuator according to the embodiment.
Figure 3:
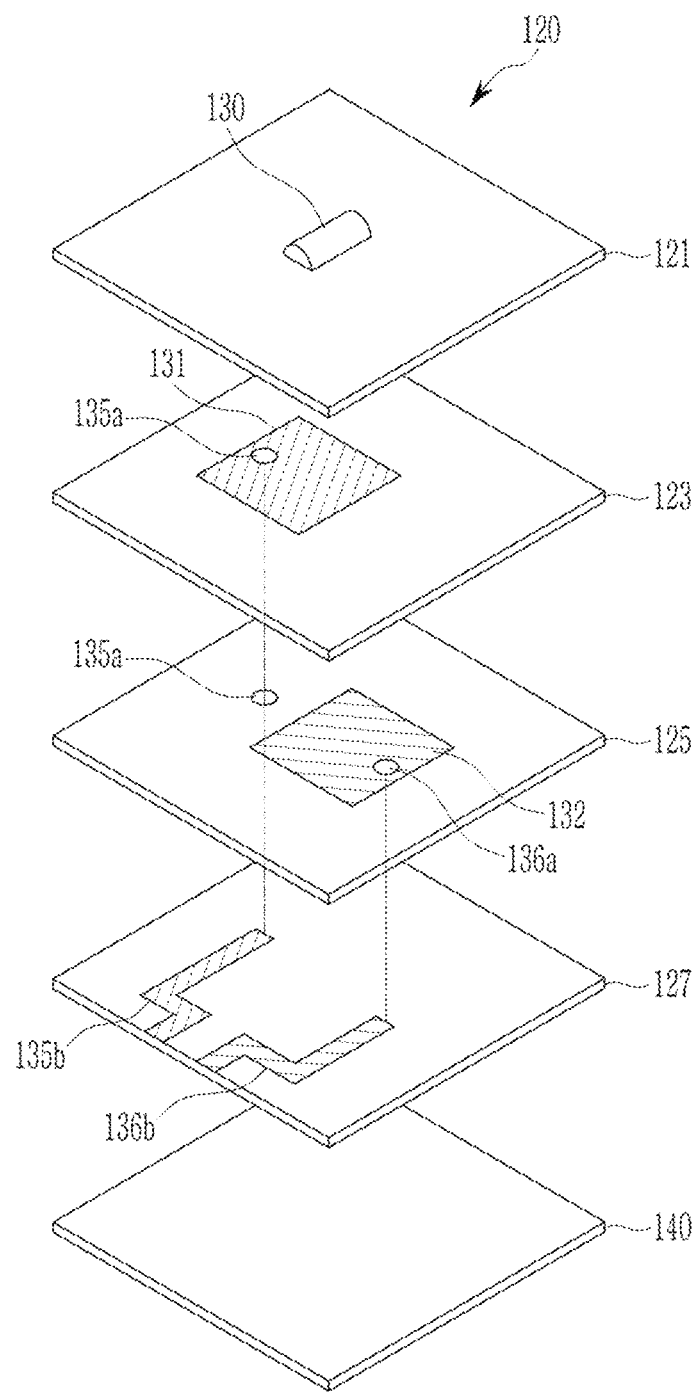
FIG. 3 is an exploded perspective view illustrating the unit driving unit of the multi-layer soft pneumatic actuator according to the embodiment.
Figure 4A:
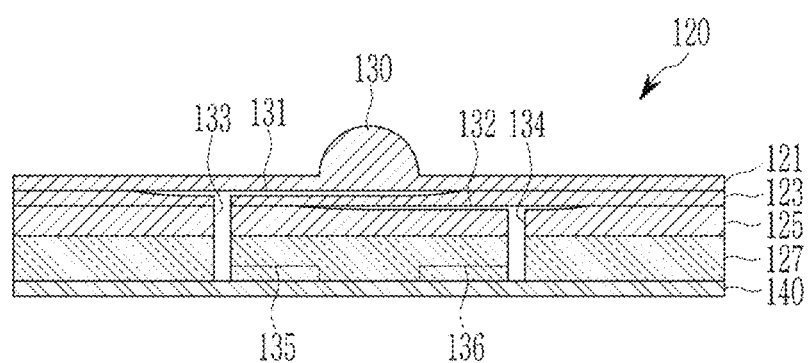
FIGS. 4A and 4B are cross-sectional views taken along line IV-IV of FIG. 2.
Figure 4B:
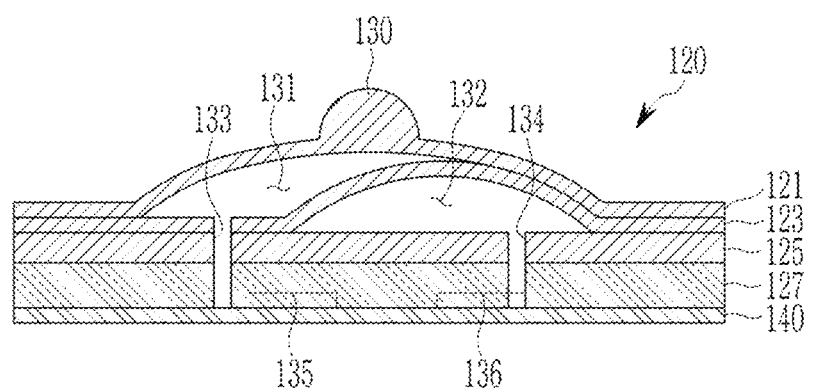

FIG. 2 is a perspective view illustrating a unit driving unit of the multi-layer soft pneumatic actuator according to the embodiment, FIG. 3 is an exploded perspective view illustrating the unit driving unit of the multi-layer soft pneumatic actuator according to the embodiment, and FIGS. 4A and 4B are cross-sectional views taken along line IV-IV of FIG. 2.

Referring to FIGS. 2 and 3, the multi-layer soft pneumatic actuator 120 according to the present embodiment may be formed by stacking a first chamber layer 123, a second chamber layer 125, and an air line layer 127 on a surface layer 121. Further, a bottom layer 140 may be optionally provided under the air line layer 127.

A driving protrusion 130 may be formed on one surface of the surface layer 121, and the first chamber layer 123 may be stacked on the other surface of the surface layer 121. That is, the driving protrusion 130 may be formed to protrude from a surface opposite to the surface of the surface layer 121 on which the first chamber layer 123 is located. For example, the driving protrusion 130 may be formed to have a round cross-section convexly in the upper direction, and may be three-dimensionally formed in a semi-cylindrical shape that is laid down. The first chamber layer 123 may include the first chamber 131, and a partial region of the first chamber 131 may be configured to overlap the driving protrusion 130. When viewed in a plan view, the driving protrusion 130 may be included in the region of the first chamber 131.

A second chamber layer 125 may be stacked on a layer different from the first chamber layer 123 on the other surface of the surface layer 121. That is, the second chamber layer 125 may be positioned below the first chamber layer 123, and may be disposed on a surface opposite to the surface from which the driving protrusion 130 protrudes. The second chamber layer 125 may include a second chamber 132, and a partial region of the second chamber 132 may be configured to overlap the driving protrusion 130 and the first chamber 131. Accordingly, when viewed in a plan view, the first chamber 131 and the second chamber 132 may include an overlapping region in which the first chamber 131 and the second chamber 132 overlap each other in the thickness direction, and the driving protrusion 130 may be included in the overlapping region.

The air line layer 127 may include a first air line 135 and a second air line 136 to inject air into the first chamber 131 and the second chamber 132, respectively. The first air line 135 may be connected to the first chamber 131, and the second air line 136 may be connected to the second chamber 132.

Here, the first air line 135 may include a first via 135a extending in a thickness direction and communicating with the first chamber 131, and a first injection line 135b communicating with the first via 135a and extending in a planar direction. In addition, the second air line 136 may include a second via 136a extending in a thickness direction and communicating with the second chamber 132 and a second injection line 136b communicating with the second via 136a and extending in a planar direction. The first via 135a may be connected to a region where the first chamber 131 does not overlap the second chamber 132, and the second via 136a may be connected to a region where the second chamber 132 does not overlap the first chamber 131. In the drawing, the first air line 135 and the second air line 136 are illustrated to be located on the same layer, but the present disclosure is not limited thereto, and the first air line 135 and the second air line 136 may be located on different layers, each of which may consist of several layers, which is also within the scope of the present disclosure.

The first air line 135 and the second air line 136 are connected to a pump (not illustrated) and a pressure regulator (not illustrated) provided on the outside of the multi-layer soft pneumatic actuator 120 so that air according to the required pressure may be injected through the pump and the pressure regulator.

The bottom layer 140 may be stacked under the air line layer 127 to support the multi-layer soft pneumatic actuator 120. In this case, the bottom layer 140 may include a material having greater rigidity than that of the surface layer 121. Also, the bottom layer 140 may include a material having greater rigidity than that of the first chamber layer 123 and the second chamber layer 125. For example, the bottom layer 140 may have greater tensile strength than that of the surface layer 121 or the chamber layers 123 and 125, so that when air is injected into and inflates the first chamber layer 123 and the second chamber layer 125, the first chamber layer 123 and the second chamber layer 125 expand relatively less than the surface layer 121, thereby imparting the directionality of the multi-layer soft pneumatic actuator 120. For example, the bottom layer 140 may be formed of a polyimide film, and the surface layer 121, the first chamber layer 123, the second chamber layer 125, and the air line layer 127 may be formed of polydimethylsiloxane (PDMS).

The bottom layer 140 may optionally be provided to the multi-layer soft pneumatic actuator 120. That is, the bottom layer 140 may be directly attached to a device (for example, the gripper of the robot hand) in which the multi-layer soft pneumatic actuator 120 including the surface layer 121, the first chamber layer 123, the second chamber layer 125, and the air line layer 127 is disposed. When the surface of the device is formed to have greater rigidity than that of each of the layers constituting the multi-layer soft pneumatic actuator 120, the surface may provide operational directionality similar to the bottom layer 140.

In this embodiment, the planar area of the driving protrusion 130 may be smaller than or equal to the planar area of the overlapping region of the first chamber 131 and the second chamber 132. Therefore, when the overlapping region of the first chamber 131 and the second chamber 132 is set, the driving protrusion 130 may be disposed to be located in the overlapping region. Accordingly, the driving protrusion 130 may perform the function of the multi-layer soft pneumatic actuator 120 while a height and a direction of the driving protrusion 130 is controlled according to the amount of air or the air pressure injected into the first chamber 131 and the second chamber 132.

In the present embodiment, the first chamber 131 and the second chamber 132 may have a quadrangular shape on a plane. Accordingly, the overlapping region of the first chamber 131 and the second chamber 132 may also have a quadrangular planar shape. However, the planar shape of the first chamber 131 and the second chamber 132 is not limited to a quadrangle and may have various planar shapes according to the design of the actuator, which also falls within the scope of the present disclosure.

The first chamber layer 123 may be attached to and fixed under the surface layer 121. In this case, the first chamber 131 may be formed by a space formed between the first chamber layer 123 and the surface layer 121, in which the first chamber layer 123 is surface-treated by a predetermined area in a surface facing the surface layer 121 and is separated without being attached to the surface layer 121 (see FIGS. 4A and 4B). Also, the second chamber layer 125 may be attached to and fixed under the first chamber layer 123. In this case, the second chamber 132 may be formed by a space formed between the second chamber 132 and the first chamber layer 123, in which the second chamber layer 125 is surface-treated by a predetermined area in a surface facing the first chamber layer 123 and is separated without being attached to the first chamber layer 123 (see FIGS. 4A and 4B).

For example, if two surfaces are bonded after plasma treatment is performed on the PDMS surface, the two surfaces are permanently bonded. In this case, when a part of the PDMS layer is masked to prevent plasma treatment, the part is not bonded. As another example, in order to bond the two surfaces of the cured PDMS, the liquid PDMS may be spread out before curing to act as an adhesive between the two surfaces. In this case, the surface except for a specific portion may be bonded by masking the surface that is not to be bonded and spreading liquid PDMS, and then bonding and curing the two surfaces.

Meanwhile, the air line layer 127 may be attached to and fixed under the second chamber layer 125. In this case, the first injection line 135b of the first air line 135 and the second injection line 136b of the second air line 136 may be formed by spaces in which the air line layer 127 is surface treated by a predetermined area in a surface facing the second chamber layer 125 or a partial surface thereof is engraved and removed and is separated without being attached to the second chamber layer 125. As a method of manufacturing the air line layer, for example, a mold having an embossed shape of the air line is manufactured, liquid PDMS is poured on the mold before curing, the PDMS is cured, and then the PDMS is separated from the mold to form an intaglio air line layer. In addition, the first via 135a of the first air line 135 passes through the first chamber layer 123 and the second chamber layer 125 to communicate the first chamber 131 and the first injection line 135b. The second via 136a of the second air line 136 may pass through the second chamber layer 125 to communicate the second chamber 132 and the second injection line 136b. As a method of forming the via, for example, a via may be formed by using a circular blade having a specific diameter (for example, a biopsy punch).

On the other hand, the air line layer may also be made of Kapton® film, which is a polyimide film, rather than PDMS. Three Kapton films are prepared, and the uppermost layer may have only via holes, the middle layer may have a shape in which the air line portion is removed, and the lowermost layer may be configured as a bottom layer. By bonding these three Kapton films together, a hollow air line layer may be made in the middle layer according to the shape of the air line.

At this time, the bonding of the PDMS and the Kapton film is commercialized as a Kapton tape coated with a silicone adhesive on the Kapton film, so when the adhesive and the PDMS are plasma-treated and then bonded, permanent bonding is possible. In addition, the bonding of Kapton tape and Kapton tape may be combined as if pasting tape because an adhesive is applied to the surface.

Referring to FIGS. 4A and 4B, FIG. 4A is a diagram illustrating a state in which air is not injected into the first chamber 131 and the second chamber 132, and FIG. 4B is a diagram illustrating a state in which air is injected into the first chamber 131 and the second chamber 132.

When air is injected into the first chamber 131 through the first air line 135, the first chamber 131 may inflate upward and push up and raise the driving protrusion 130. Also, when air is injected into the second chamber 132 through the second air line 136, the second chamber 132 inflates upward to push up and raise the partially overlapping first chamber 131 and driving protrusion 130.

Figure 5:
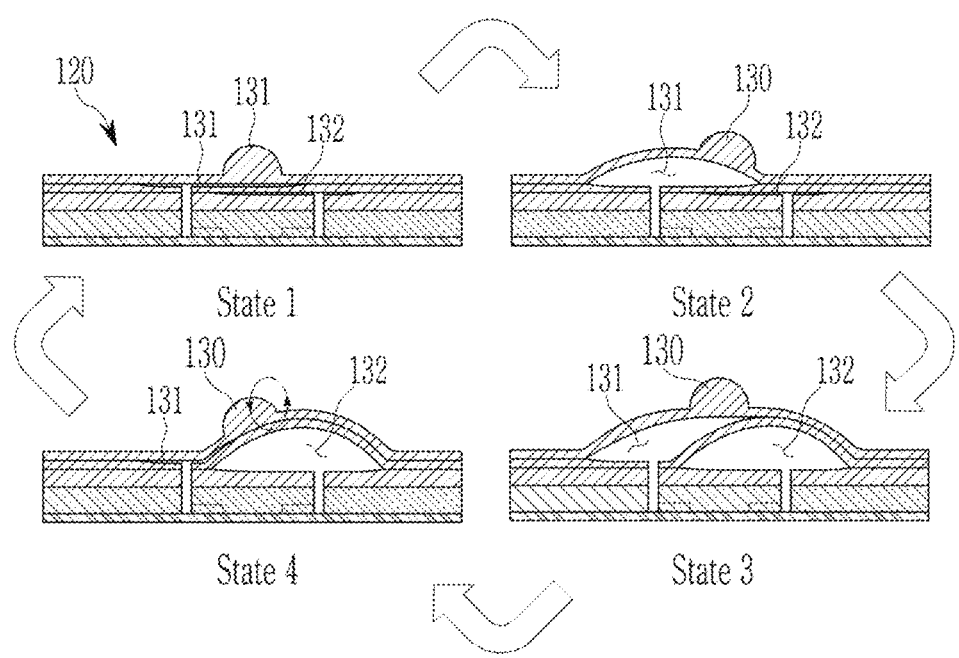
FIG. 5 is a cross-sectional view illustrating a deformed state at each stage when the unit driving unit of the multi-layer soft pneumatic actuator is driven according to the embodiment.

FIG. 5 is a cross-sectional view illustrating a deformed state at each stage when the unit driving unit of the multi-layer soft pneumatic actuator is driven according to the embodiment.

Referring to FIG. 5, first, in State 1, there is no air injection into the first chamber 131 and the second chamber 132, and in State 1, the first chamber 131 and the second chamber 132 do not expand, so that the driving protrusion 130 maintains an initial state.

Next, in State 2, air is injected into the first chamber 131, but no air is injected into the second chamber 132, and therefore, in State 2, the first chamber 131 expands and the second chamber 132 does not expand. Since the driving protrusion 130 is disposed in the overlapping region of the first chamber 131 and the second chamber 132, the driving protrusion 130 may be biased toward one side with respect to the center of the first chamber 131. Accordingly, the driving protrusion 130 is inclined toward the second chamber 132 and rises according to the expansion of the first chamber 131.

Next, since State 3 is a state in which air is injected into the first chamber 131 and the second chamber 132, the first chamber 131 expands to lift the driving protrusion 130 and the second chamber 132 further pushes the first chamber 131 and the driving protrusion 130 together so that the driving protrusion 130 rises in a straight state.

Next, in State 4, there is no air injection into the first chamber 131 (that is, the injected air is discharged) and air is injected into the second chamber 132, so that in State 4, the first chamber 131 is not expanded and the second chamber 132 is in an expanded state. Since the driving protrusion 130 is disposed in the overlapping region of the first chamber 131 and the second chamber 132, the driving protrusion 130 may be biased toward one side with respect to the center of the second chamber 132. Accordingly, according to the expansion of the first chamber 131, the driving protrusion 130 is inclined toward the first chamber 131 and rises.

As described above, the height and the inclined direction of the driving protrusion 130 may be adjusted through the control of State 1 to State 4, and through this, an object that is in contact with the driving protrusion 130 may be moved or rotated. That is, as illustrated in FIG. 1, the driving protrusion 130 may include at least two-direction driving protrusions 130a and 130b capable of generating driving force in a direction that the adjacent driving protrusions cross each other, and through the control of the protrusions, the object may be moved or rotated.

Figure 6:
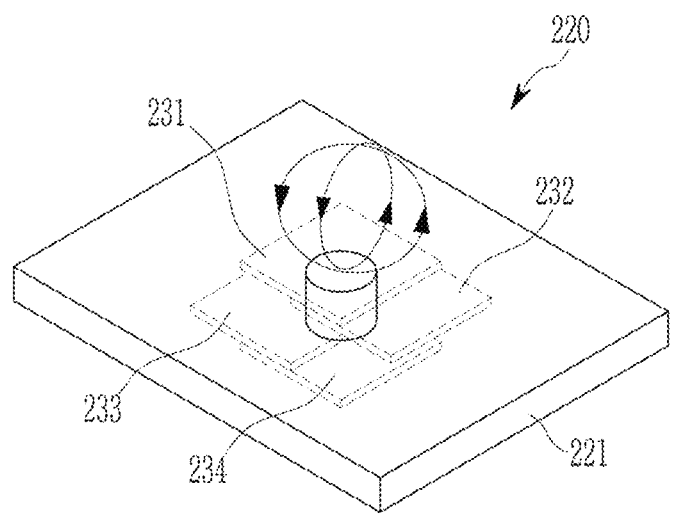
FIG. 6 is a perspective view illustrating a unit driving unit of a multi-layer soft pneumatic actuator according to another embodiment.
Figure 7:
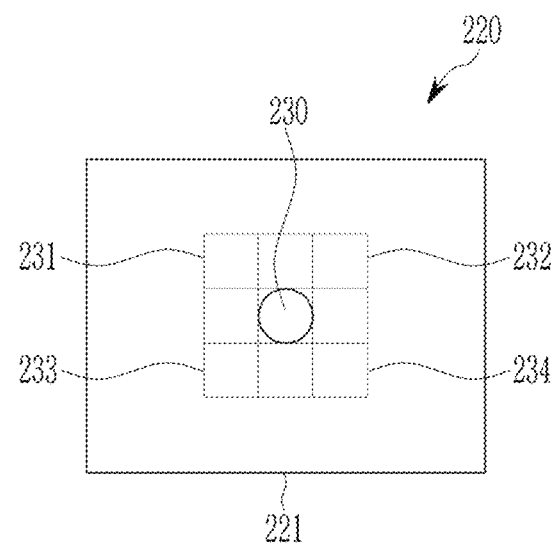
FIG. 7 is a top plan view illustrating the unit driving unit of the multi-layer soft pneumatic actuator of FIG. 6.

FIG. 6 is a perspective view illustrating a unit driving unit of a multi-layer soft pneumatic actuator according to another embodiment, and FIG. 7 is a top plan view illustrating the unit driving unit of the multi-layer soft pneumatic actuator of FIG. 6.

Referring to FIG. 6, the multi-layer soft pneumatic actuator 220 according to the present embodiment is provided with four chambers 231, 232, 233, and 234, and 2 degrees of freedom, that is, movement in 4 directions may be implemented by pneumatically controlling each of the four chambers 231, 232, 233, and 234.

The multi-layer soft pneumatic actuator 220 according to the present embodiment may include a surface layer 221 having a driving protrusion 230 formed on one surface thereof, and may include a first chamber layer stacked on the other surface of the surface layer 221 and including a first chamber 231, and a second chamber layer stacked on a different layer from that of the first chamber layer on the other surface of the surface layer 221 and including a second chamber 232. In this case, an overlapping region of the first chamber 231 and the second chamber 232 may be configured to overlap the driving protrusion 230. In the present embodiment, the driving protrusion 230 may have a cylindrical shape with a central axis perpendicular to the surface layer 221, or may have a hemispherical shape as another example.

In addition, the multi-layer soft pneumatic actuator 220 may include a third chamber layer provided in a layer different from the surface layer 221, the first chamber layer, and the second chamber layer and including a third chamber 233 and a fourth chamber layer provided in a layer different from the surface layer 221, the first chamber layer, the second chamber layer, and the third chamber layer and including a fourth chamber 234. The third chamber 233 may be configured such that a partial region overlaps the driving protrusion 230, the first chamber 231, and the second chamber 232, and the fourth chamber 234 may be configured such that a partial region overlaps the driving protrusion 230, the first chamber 231, the second chamber 232, and the third chamber 233. For convenience of illustration, in the drawings, the first chamber layer, the second chamber layer, the third chamber layer, and the fourth chamber layer are separately indicated while being distinguished from the surface layer 221, and reference numerals are not given, but each chamber layer may be formed separately and integrally combined to constitute the multi-layer soft pneumatic actuator 220.

Further, the air line layer is provided under the fourth chamber layer and be configured to inject air into each of the third chamber 233 and the fourth chamber 234, and the configuration of the air line layer may be applied with reference to the structure of the first air line and the second air line.

The multi-layer soft pneumatic actuator described with reference to FIGS. 1 to 7 may be partially or wholly applied to various mechanical elements or robot mechanisms in addition to the robot hand, and some examples will be described below.

Figure 8:
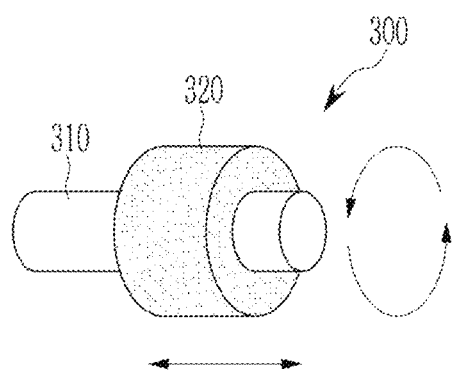
FIG. 8 is a perspective view of a mechanical element including a multi-layer soft pneumatic actuator according to another embodiment.

FIG. 8 is a perspective view of a mechanical element including a multi-layer soft pneumatic actuator according to another embodiment.

Referring to FIG. 8, a mechanical element 300 according to the present embodiment may include a drive shaft 310 located at the center and include a driving wheel mounted on the periphery of the drive shaft 310 to rotate based on the drive shaft 310 as an axis. A multi-layer soft pneumatic actuator 320 is mounted on the surface of the driving wheel to move or rotate an object that is in contact with the surface of the driving wheel by driving the multi-layer soft pneumatic actuator 320.

Figure 9:
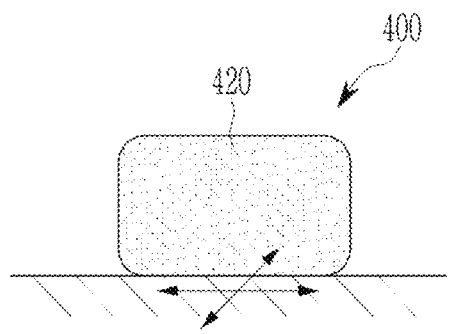
FIG. 9 is a diagram illustrating a mobile robot having a multi-layer soft pneumatic actuator according to still another embodiment.

FIG. 9 is a diagram illustrating a mobile robot having a multi-layer soft pneumatic actuator according to still another embodiment.

Referring to FIG. 9, a mobile robot 400 according to the present embodiment may include a multi-layer soft pneumatic actuator 420 on an outer surface. Therefore, the mobile robot 400 may perform relative movement by pushing the ground or floor by driving the multi-layer soft pneumatic actuator 420 in a state of being placed on the ground or floor.

Figure 10:
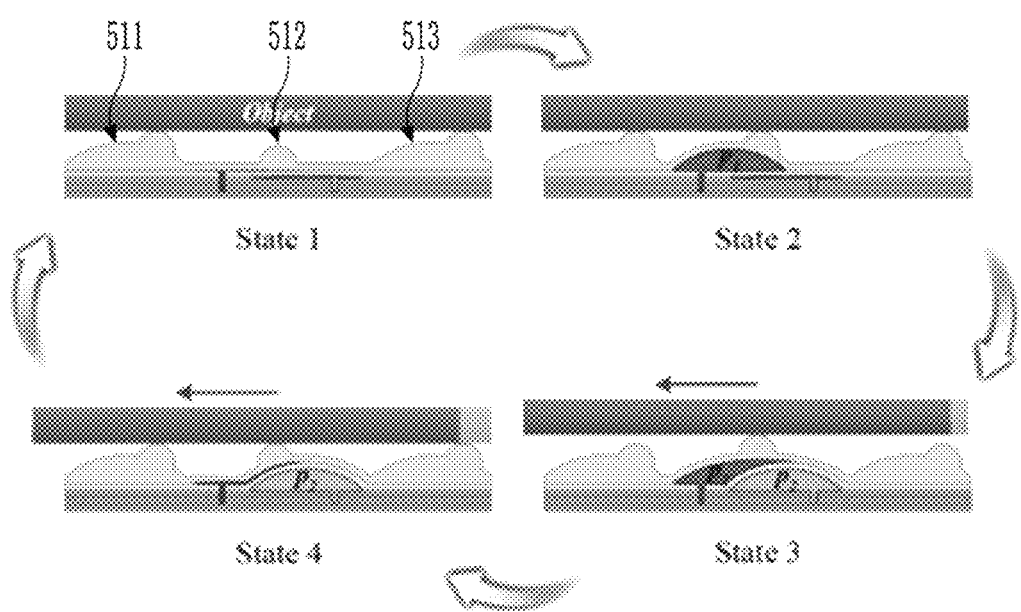
FIG. 10 is a diagram illustrating a process of moving an object by driving a multi-layer soft pneumatic actuator according to still another embodiment.
Figure 11A:
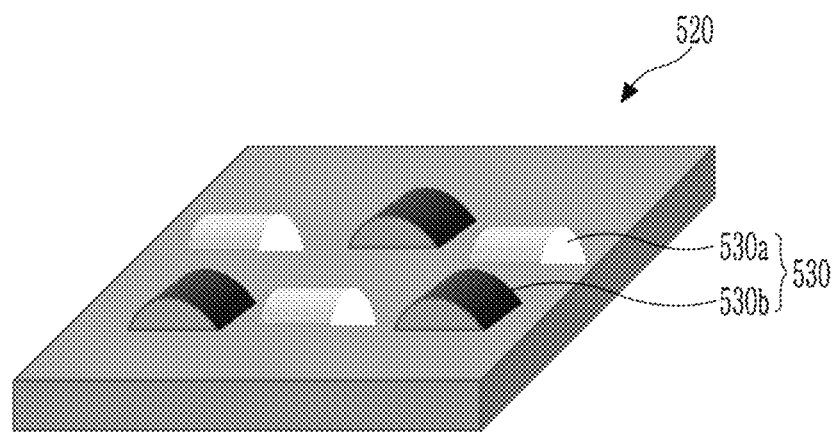
FIGS. 11A and 11B are perspective views illustrating the division of roles of driving protrusions according to a moving direction of an object.
Figure 11B:
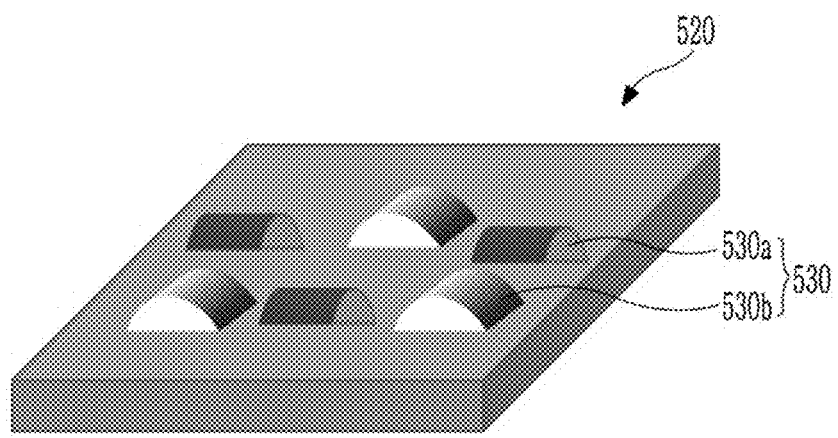

FIG. 10 is a diagram illustrating a process of moving an object by driving a multi-layer soft pneumatic actuator according to still another embodiment, and FIGS. 11A and 11B are perspective views illustrating the division of roles of driving protrusions according to a moving direction of an object.

Referring to FIG. 10, an operation of moving an object may be performed by configuring three driving units 511, 512, and 513 as a set. As described with reference to FIGS. 1 to 7, each of the driving units 511, 512, and 513 may be configured by forming the driving protrusion on the surface layer and including the first chamber layer having a first chamber and the second chamber layer including the second chamber under the surface layer. After supporting the object to a set height by using the two driving units 511 and 513 located on the left and right among the three driving units 511, 512, 513, the object may be moved by sequentially inflating the first chamber and the second chamber of the central driving unit 512 so that the driving protrusion moves in the moving direction of the object.

In this case, the left and right two driving units 511 and 513 supporting the object may be driven to inflate only one of the two chambers to have an intermediate height. The intermediate height is lower than the height when the first chamber and the second chamber of the central driving unit 512 are inflated together and the driving protrusion is the highest, and is higher than the height of the driving protrusion when no air is injected into the first chamber and the second chamber.

Referring to FIGS. 11A and 11B, in the multilayer soft pneumatic actuator 520 of the embodiment, the driving protrusion 530 may include two types of driving protrusions, that is, the first driving protrusion 530a and the second driving protrusion 530b, arranged so that the central axes intersect each other. When the first driving protrusion 530a serves as a support, the second driving protrusion 530b moves, and when the second driving protrusion 530b serves as a support, the first driving protrusion 530a moves.

Figure 12:
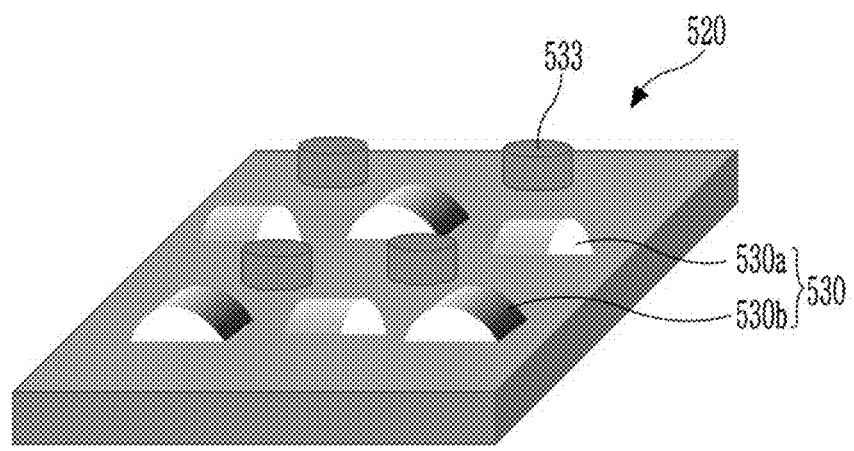
FIG. 12 is a perspective view illustrating a state in which a support protrusion is additionally formed in a multi-layer soft pneumatic actuator according to still another embodiment.

FIG. 12 is a perspective view illustrating a state in which a support protrusion is additionally formed in a multi-layer soft pneumatic actuator according to still another embodiment.

Referring to FIG. 12, in the present embodiment, in addition to the first driving protrusion 530a and the second driving protrusion 530b arranged so that the central axes intersect with each other, a supporting protrusion 533 that additionally serves as support may be provided. The support protrusions 533 may be respectively disposed between the diagonally adjacent first driving protrusions 530a or between the diagonally adjacent second driving protrusions 530b and may be formed in plurality. Each of the support protrusions 533 may have a cylindrical shape.

Figure 13:
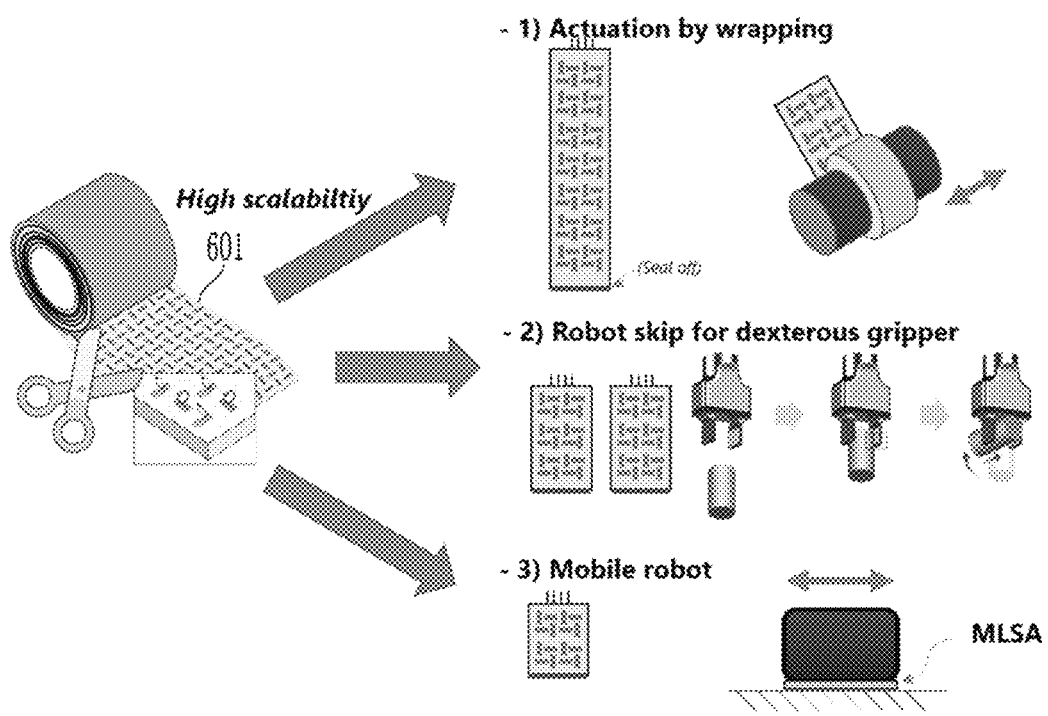
FIG. 13 is a diagram illustrating a multi-layer soft pneumatic actuator strip according to still another embodiment.

FIG. 13 is a diagram illustrating a multi-layer soft pneumatic actuator strip according to still another embodiment.

Referring to FIG. 13, a multilayer soft pneumatic actuator strip 601 according to the present embodiment includes a plurality of driving units arranged in an array in all directions, and may be made of a flexible material and wound in a roll shape. The multi-layer soft pneumatic actuator strip 601 may be cut to a required length or a required area depending on an application part and used.

Figure 14:
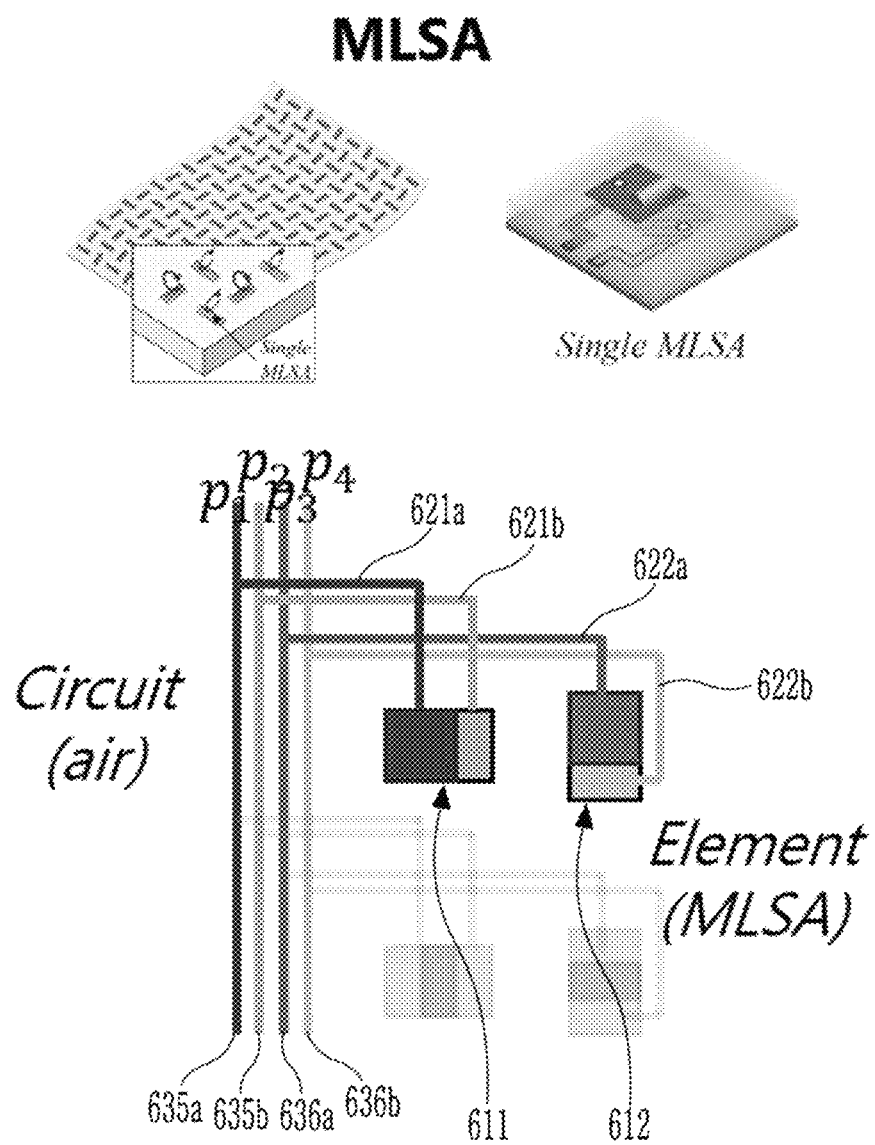
FIG. 14 is a diagram schematically illustrating a unit configuration of an air line circuit of a multi-layer soft pneumatic actuator strip according to still another embodiment.
Figure 15:
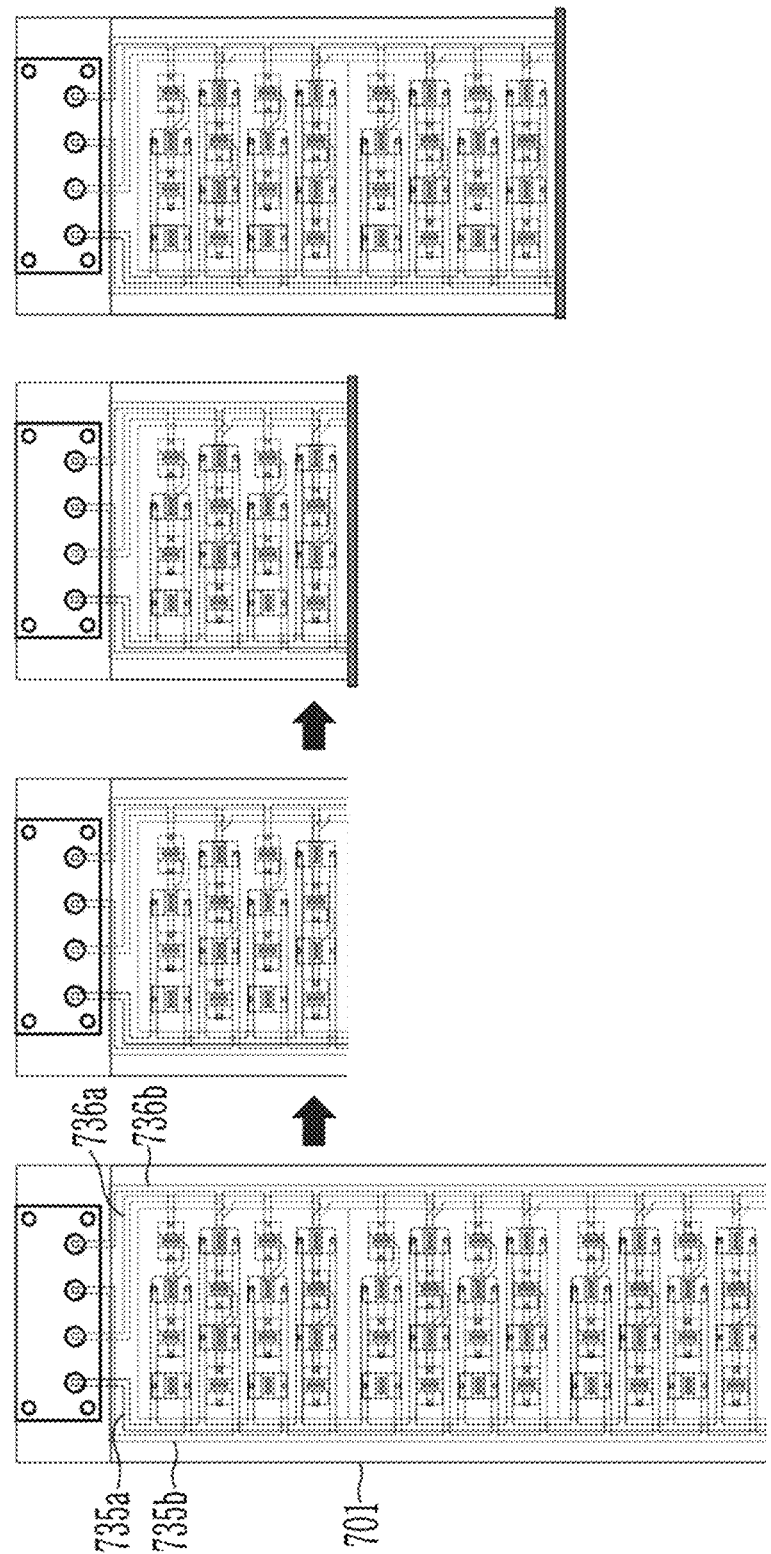
FIG. 15 is a diagram illustrating a process of sealing an air line layer by cutting the multi-layer soft pneumatic actuator strip.

FIG. 14 is a diagram schematically illustrating a unit configuration of an air line circuit of a multi-layer soft pneumatic actuator strip according to still another embodiment, and FIG. 15 is a diagram illustrating a process of sealing an air line layer by cutting the multi-layer soft pneumatic actuator strip.

Referring to FIG. 14, air lines 621a, 621b, 622a, and 622b extending from a first driving unit 611 and a second driving unit 612 having central axes intersecting with each other may be connected to main lines 635a, 635b, 636a, and 636b corresponding to the air lines 621a, 621b, 622a, and 622b, respectively to receive air for control. The main lines 635a, 635b, 636a, and 636b may include a first main line 635a, a second main line 635b, a third main line 636a, and a fourth main line 636b independent of each other, and the air lines 621a, 621b, 622a, and 622b may be branched and extend from the main lines 635a, 635b, 636a, and 636b, respectively. At this time, the first main line 635a may be connected to the first air line 621a of the first driving unit 611, and the second main line 635b may be connected to the second air line 621b of the first driving unit 611. In addition, the third main line 636a may be connected to the first air line 622a of the second driving unit 612, and the fourth main line 636b may be connected to the second air line 622b of the second driving unit 612.

Referring to FIG. 15, a multi-layer soft pneumatic actuator strip 701 according to the present embodiment has main lines 735a, 735b, 736a, and 736b connected in parallel with the air lines and extended, so that when the multi-layer soft pneumatic actuator strip 701 is cut as needed, ends of the main lines 735a, 735b, 736a, and 736b are opened so that supplied air may leak. Therefore, it may be necessary to seal the cut end of the strip 701 with a bond or tape.

Hereinafter, a multi-layer soft pneumatic actuator is manufactured through an example and the results of experiments using the multi-layer soft pneumatic actuator will be described in more detail. However, the protection scope of the present disclosure is not intended to be limited to the following examples.

Example 1. Manufacture Unit Driving Unit of Multi-Layer Soft Pneumatic Actuator

The unit driving unit of the multi-layer soft pneumatic actuator 120 of the structure illustrated in FIG. 2 was manufactured by manufacturing the structure for each layer illustrated in FIG. 3, stacking the layers, and combining the layers in order. In this case, the surface layer 121, the first chamber layer 123, the second chamber layer 125, and the air line layer 127 were made of PDMS (polydimethylsiloxane), and the bottom layer 140 was made of Kapton® film.

Regions not to be partially bonded to the surface of each layer made of PDMS were masked and plasma treated, and then the two surfaces were bonded. To prepare the air line layer, a mold having an embossed shape of the air line was prepared, liquid PDMS was poured on the mold before curing, and after the PDMS was cured, the PDMS was separated from the mold to form an intaglio air line layer. In addition, a via was created by using a circular blade having a specific diameter (such as, a biopsy punch).

Example 2: Configuration of Pneumatic Input System

Figure 16:
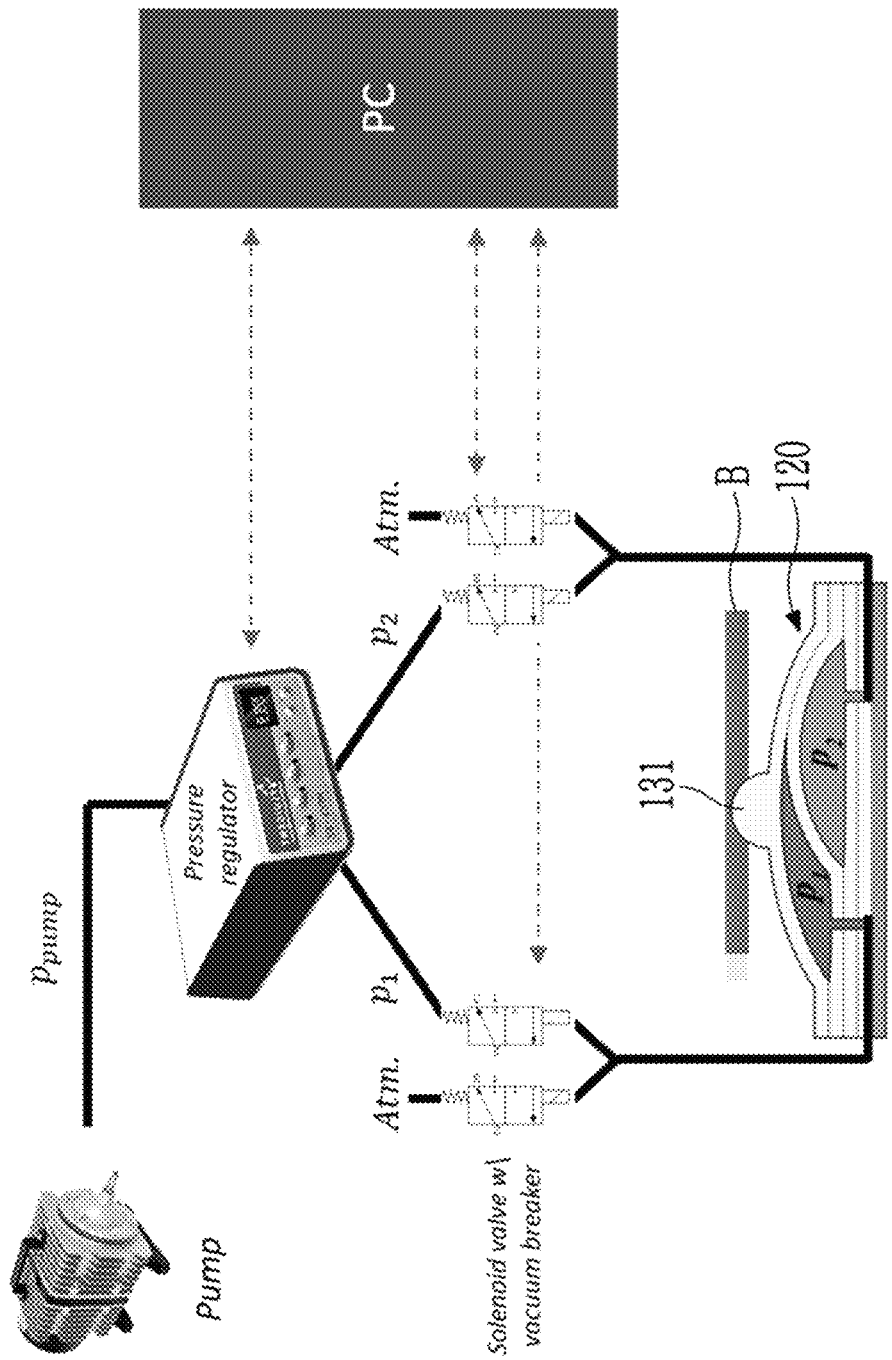
FIG. 16 is a configuration diagram schematically illustrating a pneumatic input system prepared for testing the unit driving unit of the multi-layer soft pneumatic actuator illustrated in FIG. 2.

A pneumatic input system was configured by connecting a solenoid valve having a vacuum breaker is connected to each of the first air line and the second air line of the multi-layer soft pneumatic actuator 120 manufactured in Example 1, and connecting each solenoid valve to a pressure regulator connected to the pump (see FIG. 16). The solenoid valve may be opened and closed for supply and discharge of air in the first chamber and the second chamber, and the pressure regulator may control the pressures p1 and p2 of the first chamber and the second chamber by adjusting the pressure of air supplied from the pump. In addition, the pressure regulator and each solenoid valve may be connected to a computing device (PC) to receive the signals required to control the multi-layer soft pneumatic actuator.

Example 3: Measure Normal Force and Tangential Force

Figure 17A:
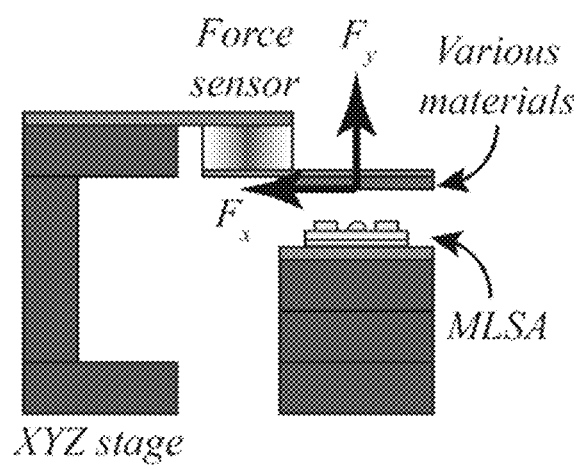
FIG. 17A is a diagram illustrating an apparatus for measuring normal force and tangential force of the unit driving unit of the multi-layer soft pneumatic actuator operated by the pneumatic input system of FIG. 16
Figure 17B:
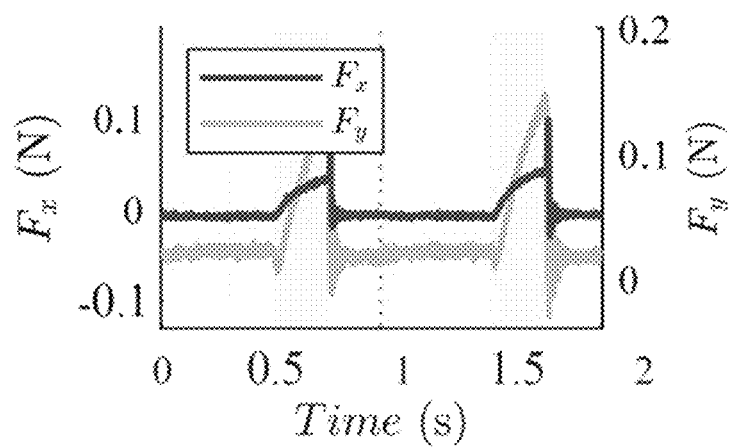
FIG. 17B is the measurement result graph.

As illustrated in FIG. 17A, the normal force ($F_y$) and the tangential force ($F_x$) of the unit driving unit of the multi-layer soft pneumatic actuator manufactured in Example 1 was measured by using the pneumatic input system configured in Example 2. As a result, the change of the normal force ($F_y$) and the tangential force ($F_x$) according to time is represented as a graph. Referring to the graph, it can be seen that the pushing force in one direction is well generated by driving the pneumatic actuator by increasing the air pressure over time (see FIG. 17B).

Although the embodiment has been described, the present disclosure is not limited thereto, and it is possible to carry out various modifications within the scope of the claims, the detailed description of the disclosure, and the accompanying drawings, and the modifications belong to the scope of the present disclosure as a matter of course.

DESCRIPTION OF SYMBOLS

100: Robot hand
120: Actuator
121: Surface layer
123: First chamber layer
125: Second chamber layer
127: Air line layer
130: Driving protrusion
131: First chamber
132: Second chamber
135: First air line
136: Second air line
140: Bottom layer
B: Object

What is claimed is:

1. A multi-layer soft pneumatic actuator, comprising:
a surface layer including driving protrusions formed on one surface;
a first chamber layer stacked on the other surface of the surface layer and including a first chamber configured to partially overlap the driving protrusion;
a second chamber layer stacked on a layer different from the first chamber layer on the other surface of the surface layer, including a second chamber having a partial region overlapping the driving protrusion and the first chamber;
an air line layer configured to inject air into each of the first chamber and the second chamber; and
a bottom layer provided under the air line layer,
wherein
the bottom layer includes a material having greater rigidity than rigidity of the surface layer.

2. The multi-layer soft pneumatic actuator of claim 1, wherein
the driving protrusion has a round cross-section convexly in an upper direction.

3. The multi-layer soft pneumatic actuator of claim 1, wherein
the driving protrusion has a hemispherical shape in which a central axis is located on the surface layer.

4. The multi-layer soft pneumatic actuator of claim 1, wherein
the first chamber layer is provided under the surface layer, and
the second chamber layer is provided under the first chamber layer.

5. The multi-layer soft pneumatic actuator of claim 4, wherein
the first chamber includes a region in which the first chamber layer is surface-treated or surface-etched by a predetermined area in a surface facing the surface layer, so that the first chamber layer is not bonded to the surface layer.

6. The multi-layer soft pneumatic actuator of claim 4, wherein
the second chamber includes a region in which the second chamber layer is surface-treated or surface-etched by a predetermined area in a surface facing the first chamber layer, so that the second chamber layer is not bonded to the first chamber layer.

7. The multi-layer soft pneumatic actuator of claim 1, wherein
the air line layer includes at least one of a first air line connected to the first chamber and a second air line connected to the second chamber.

8. The multi-layer soft pneumatic actuator of claim 7, wherein
the first air line includes a first via extending in a thickness direction and communicating with the first chamber, and a first injection line communicating with the first via and extending in a plane direction, and
the second air line includes a second via extending in a thickness direction and communicating with the second chamber, and a second injection line communicating with the second via and extending in a plane direction.

9. The multi-layer soft pneumatic actuator of claim 8, wherein
the first via is connected to a region in which the first chamber does not overlap the second chamber, and
the second via is connected to a region in which the second chamber does not overlap the first chamber.

10. The multi-layer soft pneumatic actuator of claim 1, wherein
the first chamber layer and the second chamber layer include an overlapping region in which the first chamber layer and the second chamber layer overlap in a thickness direction on a plane, and
the driving protrusion is configured to be located in the overlapping region on the plane.

11. The multi-layer soft pneumatic actuator of claim 10, wherein
a planar area of the driving protrusion is smaller than or equal to a planar area of the overlapping region.

12. The multi-layer soft pneumatic actuator of claim 10, wherein
the driving protrusion is located to be biased to one side from the center of each of the first chamber layer and the second chamber layer.

13. The multi-layer soft pneumatic actuator of claim 1, further comprising:
a third chamber layer provided in a layer different from the surface layer, the first chamber layer, and the second chamber layer, and including a third chamber having a partial region overlapping the driving protrusion, the first chamber, and the second chamber; and
a fourth chamber layer provided in a layer different from the surface layer, the first chamber layer, the second chamber layer, and the third chamber layer, and including a fourth chamber having a partial region overlapping the driving protrusion, the first chamber, the second chamber, and the third chamber.

14. The multi-layer soft pneumatic actuator of claim 13, wherein
the driving protrusion has a hemispherical shape or a cylindrical shape with a central axis vertical to the surface layer.

15. A robot mechanism including the multi-layer soft pneumatic actuator of claim 1.

16. The robot mechanism of claim 15, wherein
the robot mechanism is a robot hand including a gripper, and the gripper includes the multi-layer soft pneumatic actuator on a surface.

17. A multi-layer soft pneumatic actuator comprising a plurality of driving units, wherein
a driving unit of the plurality of driving units includes:
a surface layer with driving protrusions formed on one surface;
a first chamber layer stacked on the other surface of the surface layer and including a first chamber configured to partially overlap the driving protrusion; and
a second chamber layer stacked on a layer different from the first chamber layer on the other surface of the surface layer, including a second chamber having a partial region overlapping the driving protrusion and the first chamber,
wherein at least one pair of driving units adjacent to each other among the plurality of driving units is configured to provide driving force in directions crossing each other.

18. The multi-layer soft pneumatic actuator of claim 17, wherein
the plurality of driving units is arranged in four directions.

19. The multi-layer soft pneumatic actuator of claim 17, further comprising:
a support protrusion disposed between one pair of driving units adjacent in a diagonal direction among the plurality of driving units.

20. The multi-layer soft pneumatic actuator of claim 17, wherein
the plurality of driving units is formed in an array-arranged strip shape.

21. The multi-layer soft pneumatic actuator of claim 20, wherein
the strip includes a plurality of main lines which extend in a longitudinal direction and through which air is supplied, and
a first air line connected to the first chamber and a second air line connected to the second chamber are branched from different main lines and connected.

* * * * *